US007948602B2

(12) United States Patent
Chung

(10) Patent No.: US 7,948,602 B2
(45) Date of Patent: May 24, 2011

(54) LIQUID CRYSTAL DISPLAY AND METHOD FOR DRIVING THE SAME TO PREVENT A REPAIRED PIXEL FROM BEING A BRIGHT SPOT

(75) Inventor: Chao-Chun Chung, Tainan County (TW)

(73) Assignee: Chimei Innolux Corporation, Miao-Li County (TW)

( * ) Notice: Subject to any disclaimer, the term of this patent is extended or adjusted under 35 U.S.C. 154(b) by 1011 days.

(21) Appl. No.: 11/560,868

(22) Filed: Nov. 17, 2006

(65) Prior Publication Data

US 2007/0070012 A1 Mar. 29, 2007

Related U.S. Application Data

(63) Continuation-in-part of application No. 10/356,989, filed on Feb. 3, 2003, now abandoned.

(30) Foreign Application Priority Data

Feb. 7, 2002 (TW) .............................. 91102288 A

(51) Int. Cl.
*G02F 1/1343* (2006.01)
*G02F 1/1333* (2006.01)

(52) U.S. Cl. ............. 349/192; 349/38; 349/39; 349/54; 349/92

(58) Field of Classification Search .................... 349/38, 349/39, 54, 192, 33; 345/92
See application file for complete search history.

(56) References Cited

U.S. PATENT DOCUMENTS 4,685,770 A * 8/1987 Baeger .......................... 349/155
5,657,039 A * 8/1997 Mizukata et al. ............... 345/95
5,734,450 A * 3/1998 Irie et al. ......................... 349/39
6,115,018 A * 9/2000 Okumura et al. ............... 345/95

* cited by examiner

*Primary Examiner* — Michael H Caley
(74) *Attorney, Agent, or Firm* — Thomas|Kayden

(57) ABSTRACT

A liquid crystal display and method for driving the same to prevent a repaired pixel from being a bright spot. The LCD panel includes a plurality of pixels, each pixel including: a pixel capacitor, a storage capacitor, and a thin film transistor (TFT) having a first electrode coupled to first terminals of the pixel capacitor and storage capacitor. Two different common voltages are applied to a second terminal of the pixel capacitor and a second terminal of the storage capacitor, respectively. The two different common voltages are DC voltages and an absolute difference between them is based on a value in a voltage range corresponding to a transmittance range which indicates a pixel in a dark state substantially and is determined according to a minimum transmittance and a maximum transmittance of the LCD panel.

19 Claims, 5 Drawing Sheets

LIQUID CRYSTAL DISPLAY AND METHOD FOR DRIVING THE SAME TO PREVENT A REPAIRED PIXEL FROM BEING A BRIGHT SPOT

This application is a continuation-in-part of Ser. No. 10/356,989, filed Feb. 3, 2003, and this application claims the benefit of Taiwan application Ser. No. 091102288, filed on Feb. 7, 2002, the subject matter of which is incorporated herein by reference.

BACKGROUND OF THE INVENTION

1. Field of the Invention

The invention relates to a pixel driving device, and more particularly to a pixel driving device for a liquid crystal display and a method for driving the same.

2. Description of the Related Art

Display technology has seen great advances. Conventional cathode ray tubes (CRTs) have been gradually superseded by liquid crystal display (LCD) in the high-end display market. CRTs have some major drawbacks such as large size and high radiation emissions while LCD monitors have advantages of no radiation emissions, low power consumption, and light-weight.

FIG. 1 is a schematic diagram showing a pixel driving device for a pixel in a conventional thin film transistor liquid crystal display (TFT-LCD) panel. The LCD panel includes a plurality of pixels arranged as a matrix. Each pixel has a pixel driving device for driving liquid crystal molecules of the pixel. The pixel driving device includes a thin film transistor (TFT) having a gate electrode coupled to a scan line $S_N$ and a source electrode coupled to a data line $D_M$. The pixel driving device further includes a pixel capacitor $C_{LC}$ and a storage capacitor $C_{ST}$ wherein the storage capacitor $C_{ST}$ stores charges to hold a voltage across the pixel capacitor $C_{LC}$, thus keeping the gray scale of the pixel stable. A drain electrode of the TFT is coupled to the pixel capacitor $C_{LC}$ and the storage capacitor $C_{ST}$. The storage capacitor $C_{ST}$ and the pixel capacitor $C_{LC}$ are connected in parallel to a common line $L_{COM}$. The connection for the storage capacitor $C_{ST}$ is called a conventional "$C_{ST}$ on common" mode.

When the LCD displays frames, a drive circuit sequentially enables each scan line and turns on the TFTs of each row of pixels on the panel. Meanwhile, the drive circuit sequentially applies pixel voltages Vp from the data line corresponding to each of the pixels. The pixel voltage Vp is applied to the pixel capacitor $C_{LC}$ and the storage capacitor $C_{ST}$. Meanwhile, the common line also provides a common voltage. The capacitor voltages of the pixel capacitor $C_{LC}$ and the storage capacitor $C_{ST}$ are determined according to the voltage difference of the common voltage and the pixel voltage Vp. The pixel capacitor voltage difference is utilized to drive the liquid crystal molecules of the pixel giving the pixel a desired gray scale value while the storage capacitor voltage difference is utilized to hold the desired gray scale stable. Since the storage capacitor $C_{ST}$ and the pixel capacitor $C_{LC}$ are connected in parallel to the common line $L_{COM}$, the values of the capacitor voltages of the pixel capacitor $C_{LC}$ and the storage capacitor $C_{ST}$ are the same.

FIGS. 2A to 2B illustrate the arrangement of the liquid crystal molecules in a twisted nematic (TN) mode liquid crystal panel with and without the pixel voltage Vp applied, respectively. In FIGS. 2A and 2B, the arrows show the indicating directions of a front-plate alignment film 204 and a rear-plate alignment film 202 in the TN mode liquid crystal panel. In particular, the indicating directions of the front-plate alignment film 204 and the rear-plate alignment film 202 are perpendicular to each other. The directions of long axes of the liquid crystal molecules 200 close to the alignment films 202 and 204 are substantially parallel to the indicating directions of the alignment films 202 and 204, respectively. When no pixel voltage Vp is applied, the liquid crystal molecules 200 gradually twist until the uppermost layer close to the front-plate alignment film 204 is at a 90-degree angle to the rear-plate alignment film 202, as shown in FIG. 2A. Under these conditions, the liquid crystal molecules 200 possess high light transmission rates, and the pixel's brightness reaches a maximum. FIG. 2B shows that when the proper pixel voltage Vp is applied, the liquid crystal molecules 200 are rotated to be in parallel with the direction of the electric field. In this case, the liquid crystal molecules 200 possess low light transmission rate, and the brightness of the pixel is reduced.

During the manufacture of the panel, the gate electrode of the TFT and the lower electrode of the storage capacitor $C_{ST}$ for a pixel are formed in one manufacturing step. In addition, the drain and source electrodes of the TFT, and the upper electrode of the storage capacitor $C_{ST}$ for the pixel are all formed in another manufacturing step. For the sake of description, the gate electrode of the TFT and the lower electrode of the storage capacitor $C_{ST}$ are referred to as a first metal layer M1, while the drain and source electrodes of the TFT and the upper electrode of the storage capacitor $C_{ST}$ are referred to as a second metal layer M2. A silicon nitride ($SiN_x$) layer is provided between the lower electrode and the upper electrode of the storage capacitor $C_{ST}$ to serve as a dielectric material between the two plates of the storage capacitor $C_{ST}$.

Due to the possibility for error when manufacturing the panels, the silicon nitride layer between the lower electrode and the upper electrode of the storage capacitor $C_{ST}$ may be doped with impurities or other substances, or voids may be formed in the silicon nitride layer. If this occurs, the first metal layer and the second metal layer are short-circuited. If the two metal layers short-circuit, the electrical potentials of the lower and upper electrodes of the storage capacitor $C_{ST}$ for the pixel are equal regardless of the magnitude of pixel voltage Vp applied to the pixel. The voltage difference between the lower and upper electrodes of the pixel of the liquid crystal panel would be zero. The pixel in this case is faulty. In a TN mode liquid crystal panel, when the above-mentioned problem occurs in the storage capacitor of a pixel, the faulty pixel always displays its brightness regardless of the applied pixel voltage Vp, and causes a bright spot, especially, for a normally white TN mode liquid crystal panel. When the liquid crystal panel has a bright spot, the display quality of the liquid crystal panel is seriously degraded and customers are not willing to buy these products.

SUMMARY OF THE INVENTION

The invention is directed to a pixel driving device for a liquid crystal display (LCD) and a method for driving the liquid crystal display. When a pixel of the LCD becomes faulty due to a short-circuit between a first metal layer and a second metal layer of the pixel storage capacitor, a bright spot is prevented from appearing on the liquid crystal panel. The influence of panel manufacturing errors upon the display quality of the liquid crystal panel can thus be reduced.

According an aspect of the invention, a liquid crystal display (LCD) panel is provided. The LCD panel includes a plurality of pixels, each of the pixels including a pixel capacitor; a storage capacitor; and a thin film transistor (TFT) having a first electrode coupled to a first terminal of the pixel capacitor and a first terminal of the storage capacitor; a first common electrode, coupled to a second terminal of the pixel capacitor, which is supplied with a first common voltage; and a second common electrode, coupled to a second terminal of the storage capacitor, which is supplied with a second common voltage. The first common voltage and the second common voltage are two different DC voltages and an absolute difference between the first common voltage and the second common voltage is based on a value in a voltage range corresponding to a transmittance range which indicates a pixel in a dark state substantially and is determined according to a minimum transmittance and a maximum transmittance of the LCD panel.

According to another aspect of the invention, a method for driving a liquid crystal display (LCD) panel is provided. The LCD panel includes a plurality of pixels, each of the pixels including: a pixel capacitor, a storage capacitor, and a thin film transistor (TFT) having a first electrode coupled to a first terminal of the pixel capacitor and a first terminal of the storage capacitor. The method includes applying a first common voltage and a second common voltage to a second terminal of the pixel capacitor and a second terminal of the storage capacitor, respectively, wherein the first common voltage and the second common voltage are two different DC voltages and an absolute difference between the first common voltage and the second common voltage is based on a value in a voltage range corresponding to a transmittance range which indicates a pixel in a dark state substantially and is determined according to a minimum transmittance and a maximum transmittance of the LCD panel. If one of the pixels is a faulty pixel whose storage capacitor is short-circuited and is repaired by being electrically disconnected from a data line corresponding to the faulty pixel, the first common voltage and the second common voltage are applied to the LCD panel makes the faulty pixel in the dark state substantially.

Other objects, features, and advantages of the invention will become apparent from the following detailed description of the preferred but non-limiting embodiment. The following description is made with reference to the accompanying drawings.

DETAILED DESCRIPTION OF THE INVENTION

In a liquid crystal display, each pixel includes a pixel capacitor and a storage capacitor. In one embodiment of the invention, the storage capacitor and pixel capacitor are connected to two different common lines with two different common voltages, leading to different capacitor voltage values. When the first and the second metal layers of the storage capacitor in a pixel are short-circuited unintentionally, the pixel becomes a faulty pixel. The faulty pixel can be repaired by disconnecting the source/drain electrodes from the storage capacitor, for example, with a laser. In this way, a capacitor voltage can be maintained across the pixel capacitor when the liquid crystal display is operating. The capacitor voltage of the pixel capacitor of the repaired pixel is large enough to arrange the liquid crystal molecules of the pixel in a direction parallel to the electric field, which are arranged between the front and rear plates of the liquid crystal panel, such as a normally white (NW) mode TN LCD. Consequently, the brightness of such faulty pixel can be decreased, preventing a bright spot on the liquid crystal panel. In one embodiment of the invention, two different common voltages can be determined in a suitable voltage range to make the repaired pixel in a desired state, e.g. a dark state substantially.

Figure 1:
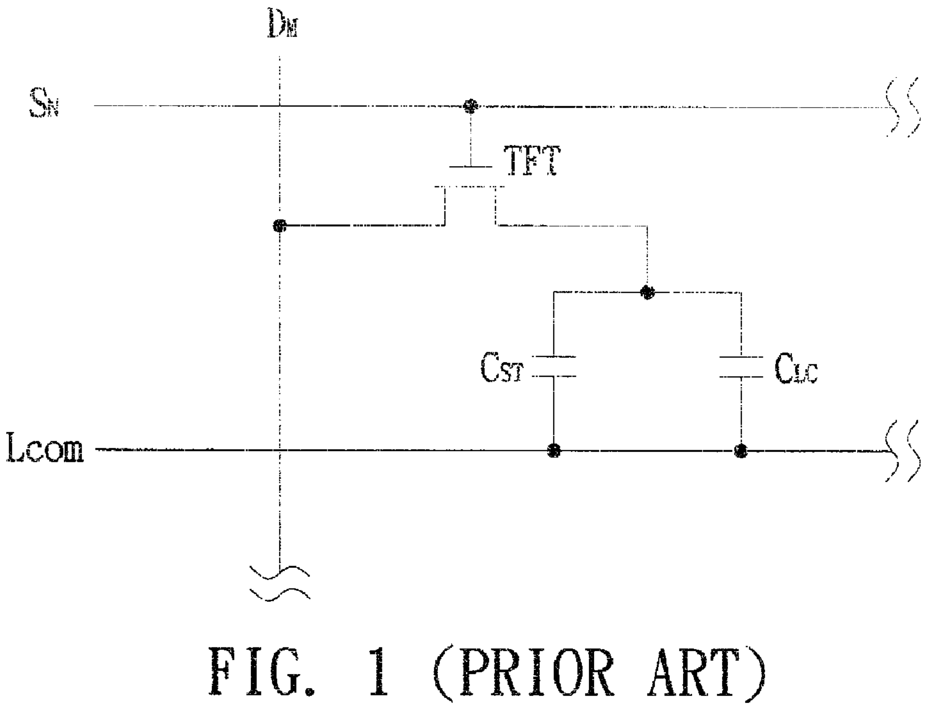
FIG. 1 (PRIOR ART)
FIG. 1 is a schematic diagram showing a pixel driving device for a pixel in a conventional TFT-LCD.
Figure 2A:
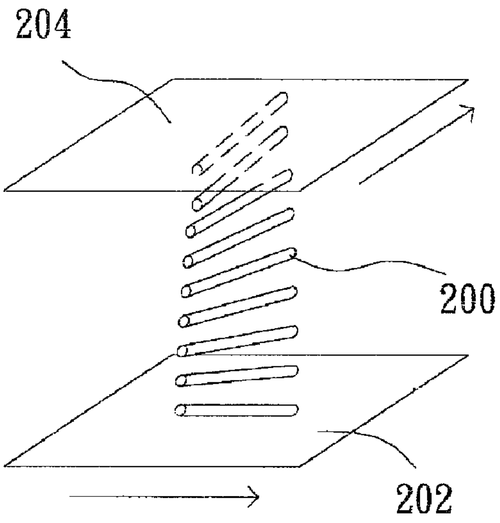
FIG. 2A (PRIOR ART)
FIGS. 2A to 2B are schematic diagrams showing the arrangement of the liquid crystal molecules in a twisted nematic (TN) mode liquid crystal panel with and without the pixel voltage Vp applied, respectively.
Figure 2B:
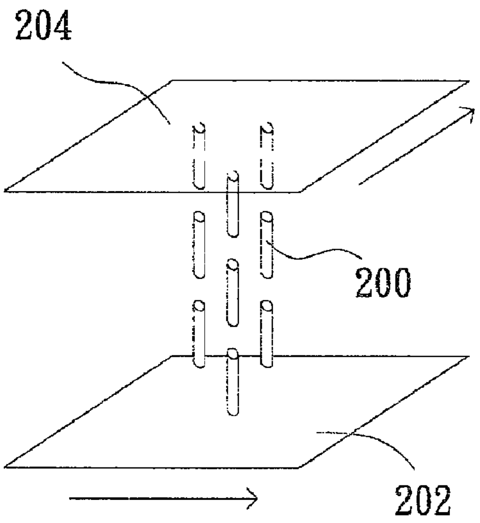
FIG. 2B (PRIOR ART)
Figure 3:
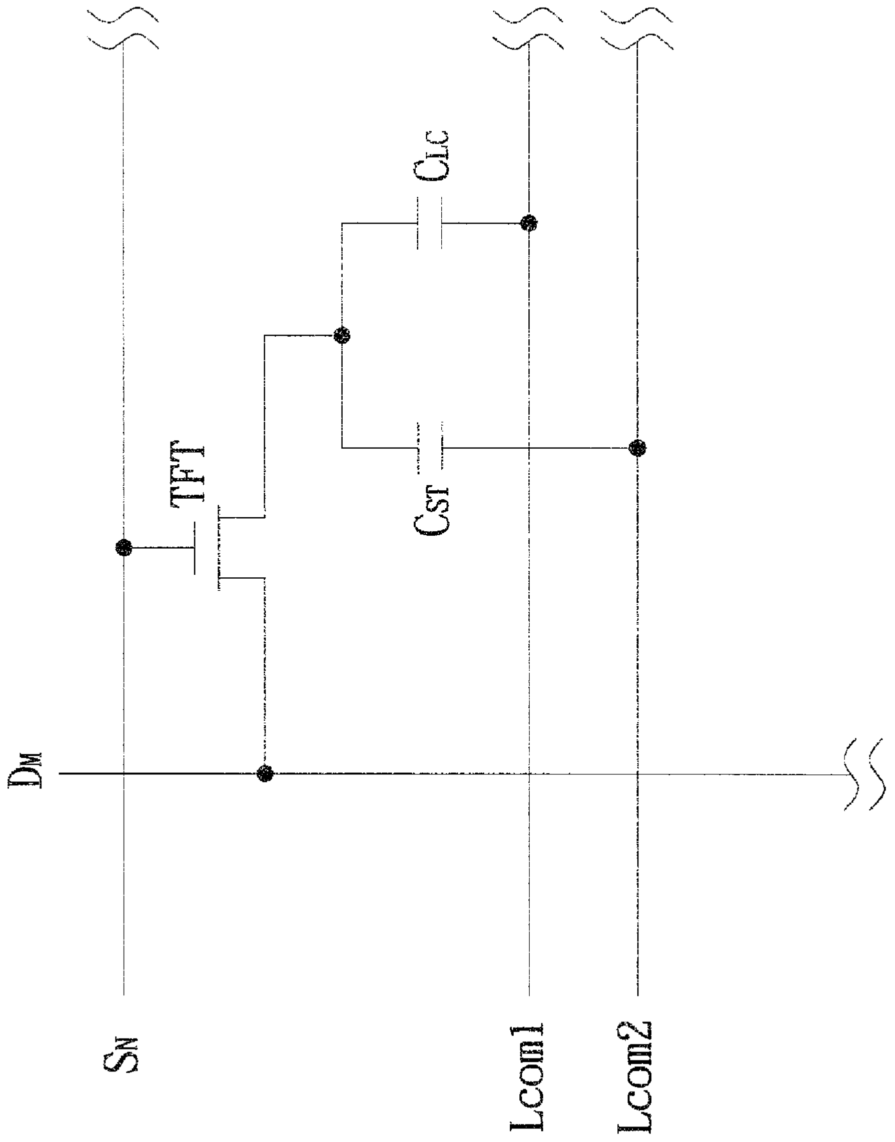
FIG. 3 is a schematic diagram showing a pixel driving device for a pixel in a TFT-LCD of the invention.

Referring to FIGS. 3, a pixel driving device for a pixel in a TFT-LCD is illustrated according to a preferred embodiment of the invention. In this embodiment, a pixel capacitor $C_{LC}$ and a storage capacitor $C_{ST}$ are respectively coupled to a first common line Lcom1 and a second common line Lcom2. The first common line Lcom1 and the second common line Lcom2 are coupled to a first power source and a second power source which can be positioned outside the liquid crystal panel, respectively. The first power source provides a first common voltage Vcom1, and the second power source provides a second common voltage Vcom2, wherein the first common voltage Vcom1 and the second common voltage Vcom2 are of different voltage levels. In addition to the second common line Lcom2, the second power source may also be connected to the gate electrode of the TFT for the pixel. In this configuration, the first common line Lcom1 provides the first common voltage Vcom1 while the second common line Lcom2 provides the second common voltage Vcom2. When the pixel voltage Vp is applied to the pixel, the capacitor voltage value of the pixel capacitor $C_{LC}$ is determined by the pixel voltage Vp and the first common voltage Vcom1. The capacitor voltage value of storage capacitor $C_{ST}$ is determined by the pixel voltage Vp and the second common voltage Vcom2. By being coupled to the different common lines with different common voltages, the pixel capacitor $C_{LC}$ and the storage capacitor $C_{ST}$ may have different capacitor voltage values.

If the first metal layer and the second metal layer of the storage capacitor $C_{ST}$ corresponding to a pixel are short-circuited, the pixel capacitor is electrically disconnected from the data line such that no voltage can be applied to the upper electrode of the storage capacitor through the source or drain electrodes. Therefore, the capacitor voltage of the pixel capacitor $C_{LC}$ is not equal to 0 but to a difference between the first common voltage Vcom1 and the second common voltage Vcom2, because the common voltages coupled to the pixel capacitor $C_{LC}$ and the storage capacitor $C_{ST}$ are different. By properly designing the voltage levels of the second common voltage Vcom2, it can be ensured that the difference between the first common voltage Vcom1 and the second common voltage Vcom2 is large enough to change the orientation of the liquid crystal molecules arranged between the front and rear plates of the pixel of the NW mode LCD panel. Accordingly, such faulty pixel will not always display its maximum brightness, and a bright spot is prevented from appearing on the liquid crystal panel.

In this embodiment, the first common voltage may be, for example, 4V and the second common voltage Vcom2 may be, for example, −5 volts. In this case, when the two electrodes of the storage capacitor $C_{ST}$ are short-circuited and then the TFT (source electrode or drain electrode) is disconnected from the data line, the difference between the first common voltage Vcom1 and the second common voltage Vcom2 can cause the liquid crystal molecules to arrange in a direction parallel to that of the electric field. At this time, the liquid crystal molecules possess low light transmission rates, and the pixel does not form a bright spot on the liquid crystal panel. Instead, the pixel is totally dark, and the influence of manufacturing inaccuracy upon the display quality of the liquid crystal panel can be reduced.

In the pixel driving device for the LCD panel disclosed in the above-mentioned embodiment of the invention, the storage capacitor and the pixel capacitor may have different capacitor voltage values, because they are coupled to common lines with different common voltage levels. Accordingly, when the first and second metal layers of the storage capacitor in a pixel are short-circuited, the pixel is faulty and is repaired so that the source/drain electrode is disconnected from the pixel capacitor. By driving the LCD panel with the common voltage levels, a capacitor voltage is maintained across the pixel capacitor. The level of the capacitor voltage is substantially large enough to arrange the liquid crystal molecules of the pixel in a direction parallel to the electric field, which are inserted between the front and rear plates of the NW mode TN LCD panel. Consequently, the brightness of such faulty pixel may be decreased, thus preventing a bright spot on the liquid crystal panel.

Further, TFT-LCDs exhibit performance limitations on viewing angles. Oblique observation of the display results in a loss of contrast and the occurrence of gray level inversions and color shifts. In other words, when users look at the TFT-LCD from any azimuth angle which is not on the axes of polarizers of the TFT-LCD, the axes of the cross polarizers from the users' view are not perpendicular to each other, thus resulting in light leakage. These undesired effects are due to the liquid crystal cell's intrinsic birefringent nature leading to angular dependent light transmittance. Various techniques to improve the viewing angle performance of LCDs can be employed. For example, a TFT-LCD can include a pair of optical compensation films arranged on front- and rear-side of the display, i.e. the matrix of twisted nematic (TN) cells, to compensate the contrast ratio of the TN cells.

The following embodiments of the invention are provided to improve the effects of repair of faulty pixels in a TFT-LCD with optical compensation films so that the repaired pixels maintain a desired state even if the TFT-LCD is viewed at specific viewing angles that abnormal situations occur. In one embodiment, the TFT-LCD is based on the structure of a pixel according to the embodiment as shown in FIG. 3. In this embodiment, the driving device for a pixel of the TFT-LCD includes a pixel capacitor $C_{LC}$ and a storage capacitor $C_{ST}$. In the driving device for a pixel, at least the pixel and storage capacitors are coupled to an electrode of the TFT, such as a source of the TFT, while the pixel and storage capacitors are supplied with two different common voltages. When the storage capacitor of a pixel is short-circuited undesirably, the pixel becomes a faulty pixel. In such case, a method of repairing the faulty pixel according to the embodiment of the invention is to disconnect the short-circuited pixel capacitor from the TFT for the pixel, thus resulting in a repaired pixel. The levels of the two different common voltages maintain a level of brightness of the repaired pixel, preferably the repaired pixel in a desired state, becoming a dark spot or imperceptible, wherein the absolute difference of two different common voltages is defined as a common voltage difference, denoted by $\Delta V_{COM}$. Further, other pixel structures based on FIG. 3 as described above, for example, with one or more capacitors or switching elements in addition to the pixel and storage capacitors, can also benefit from implementation according to the invention.

As an example, the TFT-LCD with Wide View (WV) films manufactured by Fujifilm® as optical compensation films is studied. The study of the TFT-LCD is made as to whether a faulty pixel after repaired maintains a desired state, e.g. a dark state or preferably a gray level of substantially zero, when the display is operating. Transmittance-voltage (T-V) curves of the TFT-LCD are made by using simulation of observations with different viewing angles and application of different gamma voltages to the pixels of the TFT-LCD in this embodiment. Regarding a repaired pixel, the T-V curves indicate whether the repaired pixel can maintain the desired state under certain circumstances.

For typical viewing angles, such as a center view angle, 30° to the right side, or 30° to the left side, corresponding T-V curves indicates that the transmittance is smaller (e.g. about 0.0005) when the gamma voltage exceeds about a value, e.g. 5V.

Figure 4A:
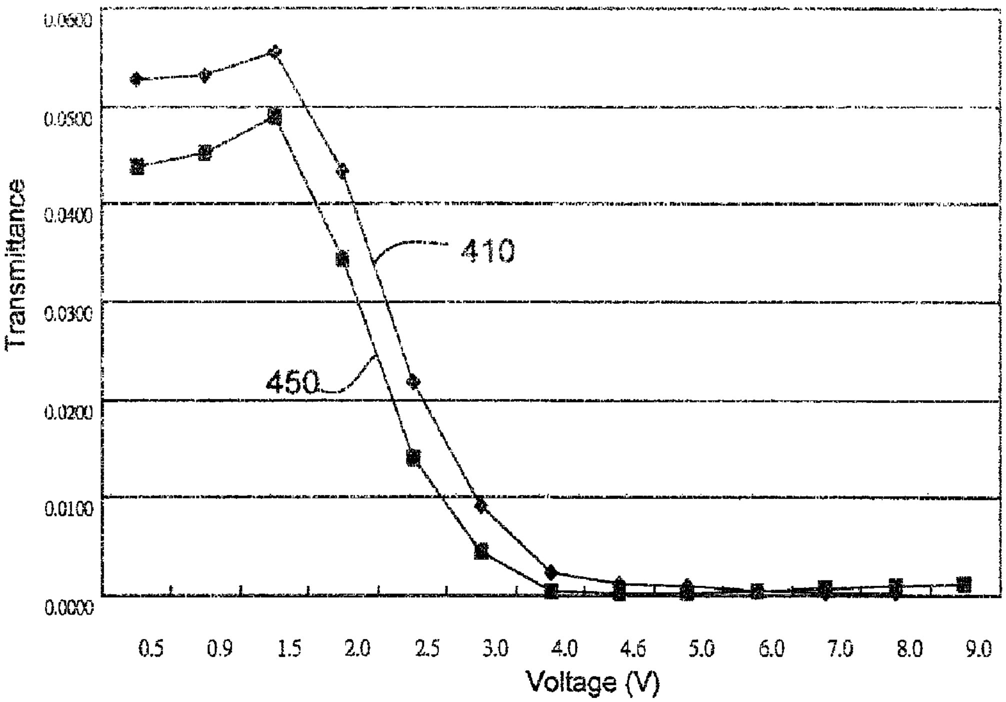
FIG. 4A shows T-V curves regarding a viewing angle of about 30° upwards.
Figure 5A:
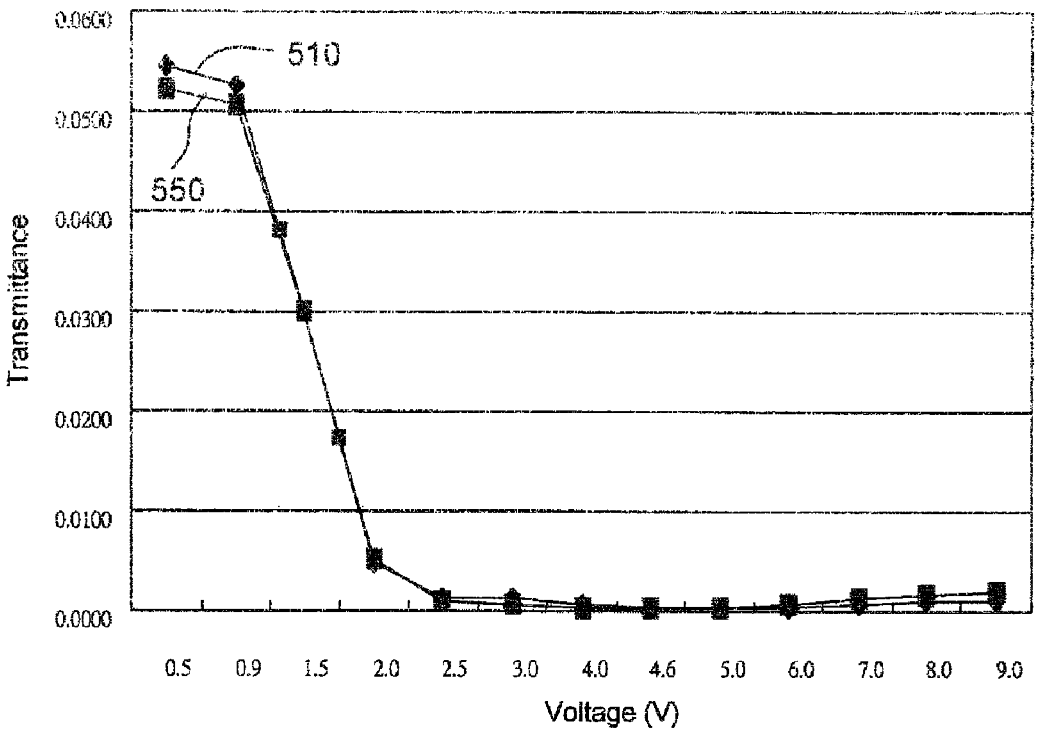
FIG. 5A shows T-V curves regarding a viewing angle of about 30° downwards.

In addition, FIG. 4A shows T-V curves regarding a viewing angle of about 30° upwards, i.e. the viewing direction of azimuth angle of about 90° and polar angle of about 30°. FIG. 5A shows T-V curves regarding a viewing angle of about 30° downwards, i.e. the viewing direction of azimuth angle of about 270° and polar angle of about 30°. In FIGS. 4A and 5A, curves 410 and 510 are the T-V curves for a TFT-LCD with a kind of WV films, denoted by WV-A, while curves 450 and 550 are the T-V curves for a TFT-LCD with another kind of WV films, denoted by WV-SA. Apparently, these curves shown in FIGS. 4A and 5A indicate that the transmittance of a pixel would be small as the gamma voltage applied is sufficiently large.

However, it is observed that light leakage occurs as the gamma voltage is in a particular range, when the display is viewed at an angle of about 30° upwards or an angle of about 30° downwards. These situations lead to display quality inconsistency in viewing angles widened by using the optical compensation films. If the display in this embodiment has one or more faulty pixels, the faulty pixels can be repaired according to a repairing method as mentioned above. However, while the gamma voltage applied to the repaired pixels is large and expected to be make the repaired pixels in a dark state, the repaired pixels become brighter spots and can be observed easily for some viewing angles, such as viewing angles of 30° upwards and downwards. In such circumstances, the display quality is degraded and customers probably will not buy this repaired display with defects perceptible.

Figure 4B:
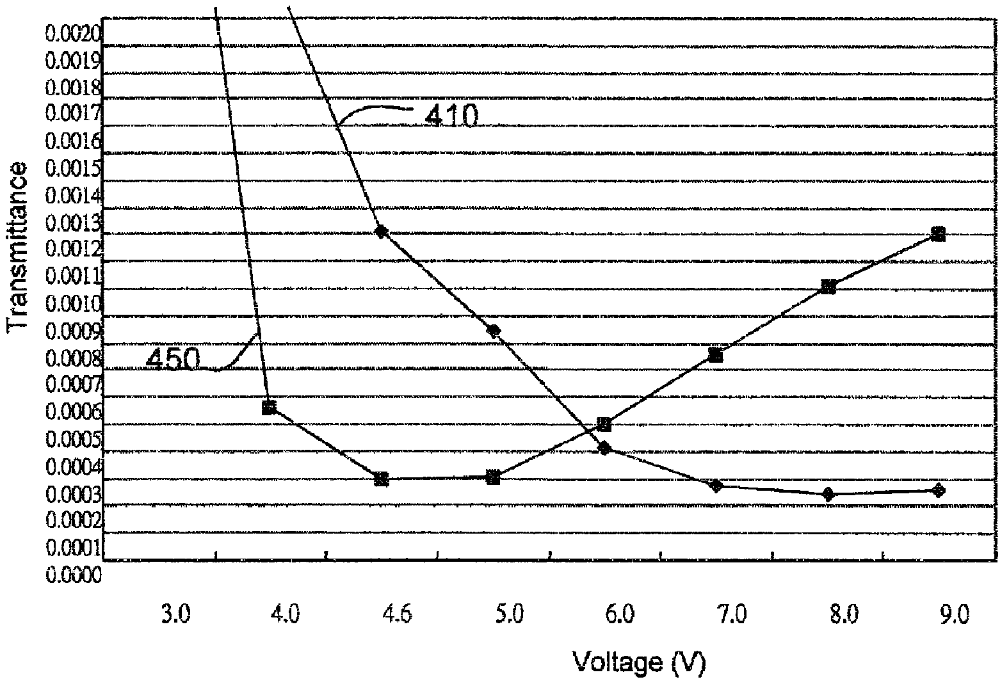
FIG. 4B shows the T-V curves in FIG. 4A partially enlarged.
Figure 5B:
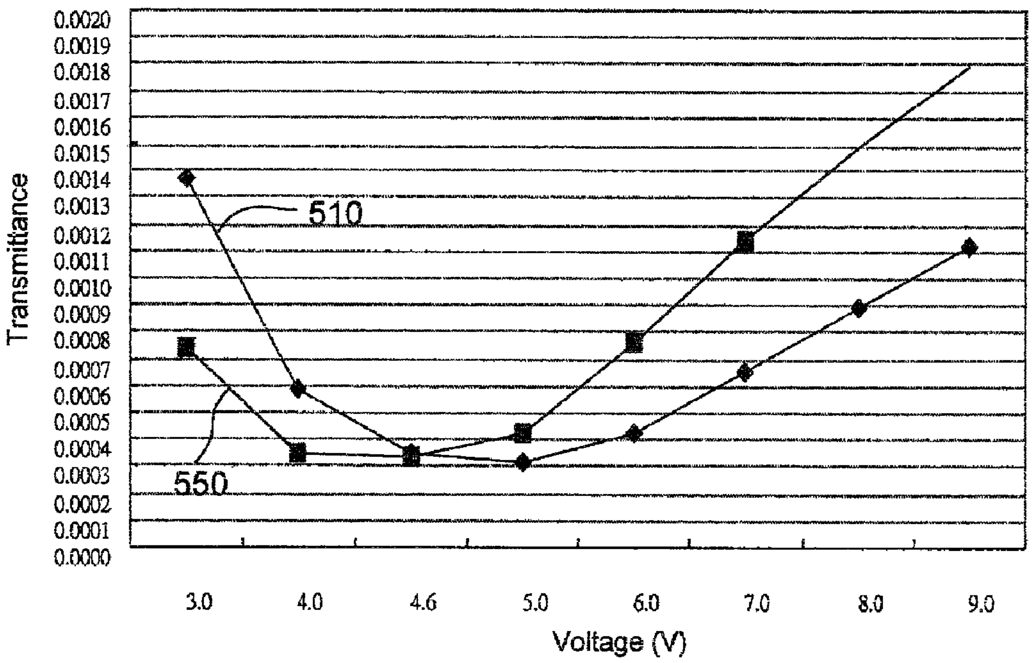
FIG. 5B shows the T-V curves in FIG. 5A partially enlarged.

Referring to FIGS. 4B and 5B, the T-V curves in FIGS. 4A and 5A are partially enlarged, along with the transmittance indicated on the vertical axis with a smaller scale. It is found that regarding the curve 450 of FIG. 4A, when the gamma voltage is within a specified range, gray level inversion occurs. For example, when the gamma voltage increases, exceeding about 5V, the gamma voltage increases correspondingly. When the gamma voltage becomes larger, e.g. about 9V, the corresponding transmittance becomes more significant as compared to the minimum one at a gamma voltage of about 5V. In such case, light leakage would be perceptible with the viewing angle of about 30° upwards. Similar undesirable situations also happen on the examples as indicated by FIG. 5B, where light leakage would be perceptible with the viewing angle of about 30° downwards. In further examples regarding WV-S, light leakage would be more perceptible with the viewing angles of more than 30° downwards or upwards when the applied gamma voltage varies from 6V to 9V.

According to an embodiment of the invention, the above problem can be resolved by properly determining a suitable difference between voltage levels of the first and second common voltages Vcom1 and Vcom2, i.e. a common voltage difference $\Delta V_{COM}$. In this embodiment, it can be determined that a common voltage difference $\Delta V_{COM}$ is large enough to change the orientation of the liquid crystal molecules arranged between the front and rear plates of the repaired pixel of the NW mode LCD panel in a desired state, e.g. a dark state, a gray level of substantially zero, or imperceptible. The repaired pixel is disconnected from its corresponding TFT and the determined common voltage difference $\Delta V_{COM}$ is applied to the repaired pixel. Therefore, the repaired pixel will not become a bright spot on the liquid crystal panel, even if the viewing angles are about 30° upwards or downwards. Preferably, the common voltage difference $\Delta V_{COM}$ is a DC value in a voltage range corresponding to a transmittance range which indicates a pixel in a dark state substantially, wherein the first common voltage and the second common voltage are two different DC voltages. The voltage range can be determined according to a minimum transmittance and a maximum transmittance of the LCD panel according to the following embodiments.

Regarding the curve 450, when the gamma voltage is about 4.6V to about 5V, the transmittance reaches a minimum, e.g. about 0.00025 to about 0.0003. The curve 450 has a maximum transmittance of about 0.049, as shown in FIG. 4A. Referring to FIG. 4B, as an example of a suitable range for determination of the common voltage difference $\Delta V_{COM}$, it is found that if a gamma voltage is chosen in the range of $V_{low1}$ to $V_{low2}$, e.g. about 4V to about 6V as in FIG. 4B for the curve 450, the corresponding transmittance would be dark enough for a repaired pixel to be in the desired state.

According to an embodiment of the invention, a common voltage difference $\Delta V_{COM}$ is determined as a value in a voltage range expressed by:

$$V_{low1} \leqq \Delta V_{COM} < V_{low2}, \quad \text{(I)}$$

wherein the upper and lower limits of voltages $V_{low1}$ and $V_{low2}$ have corresponding transmittances $T_{low1}$ and $T_{low2}$ respectively and are determined according to a minimum transmittance $T_{min}$ and a maximum transmittance $T_{max}$ (where $T_{min} < T_{low1} \leqq T_{low2} < T_{max}$). The upper and lower limits of voltages can be determined by an embodiment as follows. For any viewing angles, in order to make any faulty pixel in a desired state, e.g. a substantial dark state, having a desired transmittance sufficiently smaller than the maximum transmittance $T_{max}$, the lower limits $V_{low1}$ and $V_{low2}$ are determined such that the corresponding transmittances $T_{low1}$ and $T_{low2}$ are equal to or smaller than $R_s \cdot T_{max}$, where the factor $R_s$ is sufficiently smaller than 1, preferably about 0.1. If $T_{\Delta V}$ is a transmittance corresponding to $\Delta V_{COM}$ according to equation (I), it follows that $T_{min} \leqq T_{\Delta V} \leqq R_s \cdot T_{max}$. Besides, the factor $R_s$ is sufficiently smaller than 1 so that a repaired pixel supplied with a voltage of $\Delta V_{COM}$ would be in a dark state substantially.

In the above embodiment, if the maximum transmittance $T_{max}$ is used to define a maximum gray level of $N_{max}$ ($N_{max}>0$), gray levels of the transmittances $T_{low1}$ and $T_{low2}$ are equal to or smaller than $R_s \cdot N_{max}$, where the factor $R_s$ is about 0.1 preferably. For instance, if a pixel has a range of gray levels of 256 and $R_s$ is about 0.1, gray levels of the transmittances $T_{low1}$ and $T_{low2}$ can be equal to or smaller than about 25.6.

Figure 6:
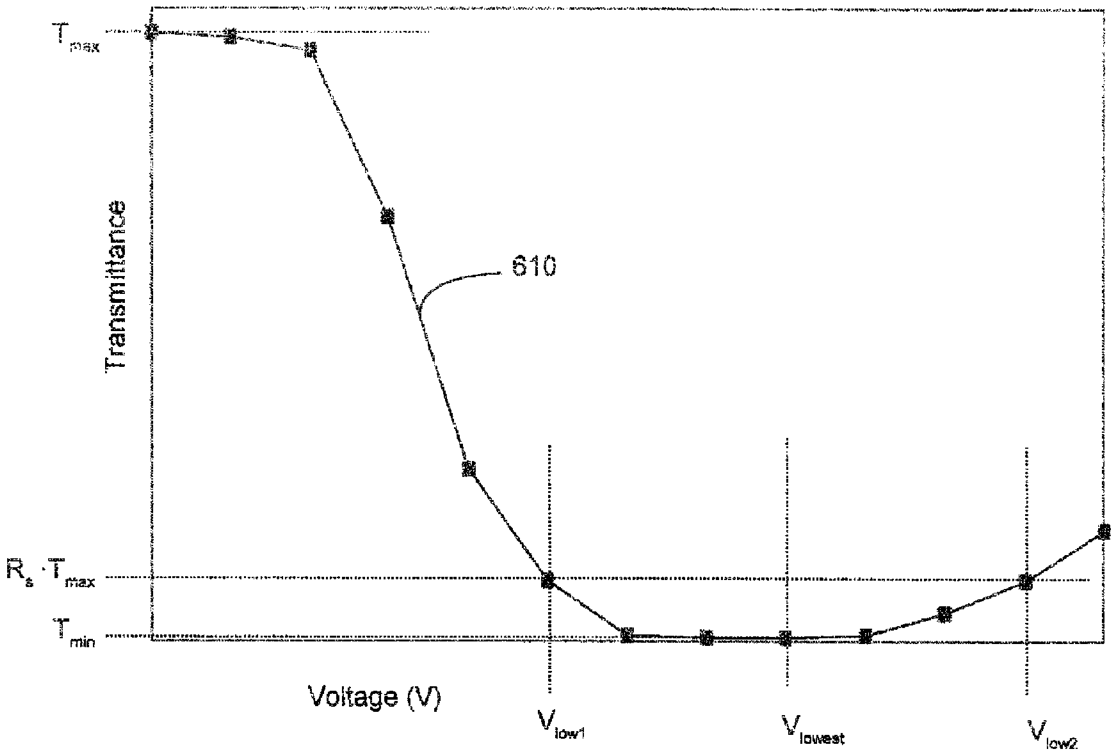
FIG. 6 shows an example of a T-V curve with respect to a specific viewing angle for determining a suitable voltage range according to an embodiment of the invention.

Referring to FIG. 6, an example of a T-V curve 610 with respect to a specific viewing angle is illustrated where gray level inversion occurs. In FIG. 6, the minimum transmittance $T_{min}$ corresponds to a gamma voltage $V_{lowest}$ and gray level inversion occurs for any gamma voltage larger than the gamma voltage $V_{lowest}$. Since the curve 610 indicating gray level inversion is concave upward at a point ($V_{lowest}$, $T_{min}$), there exist two points ($V_{low1}$, $T_{low1}$) and ($V_{low2}$, $T_{low2}$) on the curve 610 such that $T_{low1}=T_{low2}=R_s \cdot T_{max}$. For example, if the factor $R_s$ is set to 0.1, $T_{low1}$ and $T_{low2}$ are equal to $0.1T_{max}$. If the maximum transmittance $T_{max}$ is given and the factor $R_s$ is determined, the upper and lower limits of voltages $V_{low1}$ and $V_{low2}$ can then be determined according to the curve 610. Since the curve 610 in FIG. 6 is for a specific viewing angle, any gamma voltage $\Delta V_{COM}$ in a voltage range defined by the upper and lower limits of voltages $V_{low1}$ and $V_{low2}$ according to equation (I) can make any faulty pixel in a desired state with respect to the specific viewing angle. Therefore, if T-V curves with respect to one or more viewing angles, especially the T-V curves indicating gray level inversion, are involved in determination of the upper and lower limits of voltages in equation (I), the resulting upper and lower limits of voltages $V_{low1}$ and $V_{low2}$ become optimal and undesired spot would not happen substantially.

In an example, if factor $R_s$ is properly chosen, the upper and lower limits of voltages determined from at least a V-T curve indicating gray level inversion such as the curve 450 in FIG. 4B would be suitable for resolving the gray level inversion problem for many different viewing angles, such as the curve 550 in FIG. 5B. For instance, regarding the curve 450, there is a minimum point ($V_{min}$, $T_{min}$), e.g. (4.8, 0.0003), corresponding to a minimum transmittance $T_{min}$, e.g. about 0.0003, as shown in FIG. 4B, and a maximum point ($V_{max}$, $T_{max}$), e.g. (1.5, 0.049), corresponding to a maximum transmittance $T_{max}$, e.g. about 0.049, as shown in FIG. 4A. For example, the factor $R_s$ is taken as 0.01 (<<0.1) and $T_{max}=0.049$ so that $R_s \cdot T_{max}=0.00049$, about 0.0005. Referring to FIG. 4B, since the curve 450 is concave upwards at point ($V_{min}$, $T_{min}$), e.g. (4.8, 0.0003), there should have two points on the curve 450 having a transmittance $T_x$ of about $R_s \cdot T_{max}=0.00049$. For example, two points on the curve 450, ($V_{low1}$, $T_{low1}$)=(4, 0.00055) and ($V_{low2}$, $T_{low2}$)=(6, 0.0005), are taken. Therefore, a common voltage difference $\Delta V_{COM}$ is determined as a value in a voltage range expressed by 4 Volt$\leqq \Delta V_{COM} \leqq$6 Volt, where $V_{low1}$=4 Volt and $V_{low2}$=6 Volt. Since the minimum transmittance for the curve 450 is within this range, $\Delta V_{COM}$ can be taken as 4.6 Volt corresponding to a gray level of zero substantially (transmittance=0.0003). In addition, this voltage range is found also suitable for the curve 550 in FIG. 5B; that is, this voltage range is useful with respect to two different viewing angles. Further, the factor $R_s$ can be taken as different values dependent on the characteristics of the LCD, such as thickness of the liquid crystal layer of the display.

The voltage range for determination of a common voltage difference $\Delta V_{COM}$ can be defined or expressed in different manners. In another embodiment, if the gray level of zero corresponds to a gamma voltage $V_0$, a common voltage difference $\Delta V_{COM}$ is determined as a value in a voltage range expressed by $A \cdot V_0 \leqq \Delta V_{COM} \leqq B \cdot V_0$, wherein A is smaller than B and A and B are dependent on the characteristics of the LCD, such as the thickness of the liquid crystal layer of the display. For example, as in FIG. 4B, $V_0$ can be taken as 4.0 Volt, A=1, and B=1.5. In other embodiment, if the minimum transmittance corresponding to a gamma voltage $V_{min}$, a common voltage difference $\Delta V_{COM}$ is determined as a value in a voltage range expressed by $C \cdot V_{min} \leqq \Delta V_{COM} \leqq D \cdot V_{min}$, wherein C is smaller than D and C and D are dependent on the characteristics of the LCD, such as the thickness of the liquid crystal layer of the display. For example, as in FIG. 4B, $V_{min}$ can be taken as 4.6 Volt, C=0.85, and D=1.3.

In the following embodiments, the manner of supplying Vcom1 and Vcom2 are concerned. In one embodiment with a TFT-LCD based on the driving device for a pixel, as shown in FIG. 3, a pixel capacitor $C_{LC}$ and a storage capacitor $C_{ST}$ are coupled to the TFT of the pixel while the pixel capacitor $C_{LC}$ is supplied with a first common voltage Vcom1 having a DC voltage level lying between a ground voltage and a data high signal level and a storage capacitor $C_{ST}$ is supplied with a second common voltage Vcom2. The data high signal level is for driving a pixel in a bright state, for example. In order to prevent light leakage from repaired pixels, if exist, the first and second common voltages are applied to the pixel capacitor $C_{LC}$ and storage capacitor $C_{ST}$ respectively such that a common voltage difference $\Delta V_{COM}$ is in the voltage range as described in the above embodiment. For example in a TFT-LCD with compensation films such as WV-SA, the data high signal level is about 9V, the first common voltage is about 4.8V, and the second common voltage is 0V such that the common voltage difference $\Delta V_{COM}$ is 4.8V. In terms of implementation, it is preferably to take the second common voltage as a ground voltage because the ground voltage is easily obtained.

With the common voltage difference properly determined as embodied above, a method for driving the LCD panel is provided according an embodiment of the invention. The method includes applying the first common voltage and the second common voltage to a second terminal of the pixel capacitor and a second terminal of the storage capacitor, respectively, wherein the first common voltage and the second common voltage are two different DC voltages and an absolute difference between the first common voltage and the second common voltage is based on a value in a voltage range corresponding to a transmittance range which indicates a pixel in a dark state substantially and is determined according to a minimum transmittance and a maximum transmittance of the LCD panel. If one of the pixels is a faulty pixel whose storage capacitor is short-circuited and is repaired by being electrically disconnected from a data line corresponding to the faulty pixel, applying the first common voltage and the second common voltage to the faulty pixel, making the faulty pixel in the dark state substantially.

While the invention has been described by way of examples and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for driving a liquid crystal display (LCD) panel, wherein the LCD panel comprises a plurality of pixels, each of the pixels comprising:

a pixel capacitor, a storage capacitor, and a thin film transistor (TFT) having a first electrode coupled to a first terminal of the pixel capacitor and a first terminal of the storage capacitor, the method comprising:

applying a first common voltage and a second common voltage to a second terminal of the pixel capacitor and a second terminal of the storage capacitor, respectively, wherein the first common voltage and the second common voltage are two different fixed DC voltages and an absolute difference between the first common voltage and the second common voltage is based on a value in a voltage range corresponding to a transmittance range which indicates a pixel in a dark state substantially and is determined according to a minimum transmittance and a maximum transmittance of the LCD panel;

if one of the pixels is a faulty pixel whose storage capacitor is short-circuited and is repaired by being electrically disconnected from a data line corresponding to the faulty pixel, applying the first common voltage and the second common voltage to the faulty pixel, making the faulty pixel in the dark state substantially.

2. The method of claim 1, wherein the LCD panel is in twisted nematic mode and further comprises optical compensation films, wherein the absolute difference, denoted by $\Delta V_{COM}$, is determined based on a value in the voltage range expressed by:

$$V_{low1} \leqq \Delta V_{COM} \leqq V_{low2},$$

wherein $V_{low1}$ and $V_{low2}$ indicate two voltages having corresponding transmittances $T_{low1}$ and $T_{low2}$ respectively such that for any viewing angle, $(T_{min} < T_{low1} \leqq T_{low2} < T_{max})$ the transmittances $T_{low1}$ and $T_{low2}$ are equal to or smaller than $R_s$ times the maximum transmittance, where the factor $R_s$ is smaller than 1.

3. The method of claim 2, wherein the factor $R_s$ is about 0.1.

4. The method of claim 1, wherein the LCD panel is in twisted nematic mode and further comprises optical compensation films, wherein the absolute difference, denoted by $\Delta V_{COM}$, is determined based on a value in the voltage range expressed by:

$$V_{low1} \leqq \Delta V_{COM} \leqq V_{low2},$$

wherein the maximum transmittance is defined as a maximum gray level $N_{max}$, where $N_{max}>0$, $V_{low1}$ and $V_{low2}$ indicate two voltages having corresponding transmittances $T_{low1}$ and $T_{low2}$ respectively such that for any viewing angles, on the basis of the maximum gray level, gray levels of the transmittances $T_{low1}$ and $T_{low2}$ are equal to or smaller than $R_s \cdot N_{max}$, where the factor $R_s$ is smaller than 1.

5. The method of claim 4, wherein the factor $R_s$ is about 0.1.

6. The method of claim 1, wherein if a gray level of zero for a pixel of the LCD panel corresponds to a gamma voltage $V_0$, the absolute difference is determined as a value in the voltage range expressed by $A \cdot V_0 \leqq \Delta V_{COM} \leqq B \cdot V_0$, wherein value A is smaller than value B and the values A and B are dependent on the characteristics of the LCD.

7. The method of claim 6, wherein the values A and B are dependent on a thickness of the liquid crystal layer of the display.

8. The method of claim 1, wherein if the minimum transmittance corresponding to a gamma voltage $V_{min}$, the absolute difference is determined as a value in the voltage range expressed by $C \cdot V_{min} \leqq \Delta V_{COM} \leqq D \cdot V_{min}$, wherein value C is smaller than value D and the values C and D are dependent on the characteristics of the LCD.

9. The method of claim 1, wherein the values C and D are dependent on a thickness of the liquid crystal layer of the display.

10. The method of claim 1, wherein the first common voltage has a DC voltage level lying between a ground voltage and a data high signal level and the second common voltage is substantially the ground voltage.

11. The method of claim 10, wherein the absolute difference between the first common voltage and the second common voltage is equal to a value in the voltage range.

12. A liquid crystal display (LCD) panel, comprising:

a plurality of pixels, each of the pixels comprising:
- a pixel capacitor,
- a storage capacitor, and
- a thin film transistor (TFT) having a first electrode coupled to a first terminal of the pixel capacitor and a first terminal of the storage capacitor;

a first common electrode, coupled to a second terminal of the pixel capacitor, which is supplied with a first common voltage;

a second common electrode, coupled to a second terminal of the storage capacitor, which is supplied with a second common voltage;

wherein the first common voltage and the second common voltage are two different fixed DC voltages and an absolute difference between the first common voltage and the second common voltage is based on a value in a voltage range corresponding to a transmittance range which indicates a pixel in a dark state substantially and is determined according to a minimum transmittance and a maximum transmittance of the LCD panel.

13. The LCD panel of claim 12, wherein at least one of the pixels is a faulty pixel whose storage capacitor is short-circuited and is repaired so that the pixel capacitor is electrically disconnected from a data line corresponding to the faulty pixel, and the first common voltage and the second common voltage applied to the LCD panel enable the faulty pixel in the dark state substantially.

14. The LCD panel of claim 12, wherein the first common voltage has a DC voltage level lying between a ground voltage and a data high signal level and the second common voltage is substantially the ground voltage.

15. The LCD panel of claim 14, wherein the absolute difference between the first common voltage and the second common voltage is equal to a value in the voltage range.

16. The LCD panel of claim 12, wherein the LCD panel is in twisted nematic mode and further comprises optical compensation films, wherein the absolute difference, denoted by $\Delta V_{COM}$, is determined based on a value in the voltage range expressed by:

$$V_{low1} \leqq \Delta V_{COM} \leqq V_{low2},$$

wherein $V_{low1}$ and $V_{low2}$ indicate two voltages having corresponding transmittances $T_{low1}$ and $T_{low2}$ respectively such that for any viewing angles, the transmittances $T_{low1}$ and $T_{low2}$ are equal to or smaller than $R_s$ times the maximum transmittance, where the factor $R_s$ is smaller than 1.

17. The LCD panel of claim 16, wherein the factor $R_s$ is about 0.1.

18. The LCD panel of claim 12, wherein the LCD panel is in twisted nematic mode and further comprises optical compensation films, wherein the absolute difference, denoted by $\Delta V_{COM}$, is determined based on a value in the voltage range expressed by:

$$V_{low1} \leqq \Delta V_{COM} \leqq V_{low2},$$

wherein the maximum transmittance is defined as a maximum gray level $N_{max}$, where $N_{max}>0$, $V_{low1}$ and $V_{low2}$ indicate two voltages having corresponding transmittances $T_{low1}$ and $T_{low2}$ respectively such that for any viewing angles, on the basis of the maximum gray level $N_{max}$, gray levels of the transmittances $T_{low1}$ and $T_{low2}$ are equal to or smaller than $R_s \cdot N_{max}$, where the factor $R_s$ is smaller than 1.

19. The LCD panel of claim 18, wherein the factor $R_s$ is about 0.1.

* * * * *